(12) United States Patent
Deilmann et al.

(10) Patent No.: US 9,091,753 B2
(45) Date of Patent: Jul. 28, 2015

(54) LEVEL MEASURING SYSTEM OPERATING ACCORDING TO THE RADAR PRINCIPLE

(71) Applicant: KROHNE Messtechnik GmbH, Duisburg (DE)

(72) Inventors: Michael Deilmann, Essen (DE); Michael Gerding, Bochum (DE); Uwe Wegemann, Moers (DE); Nils Pohl, Bochum (DE)

(73) Assignee: KROHNE Messtechnik GmbH, Duisburg (DE)

( * ) Notice: Subject to any disclaimer, the term of this patent is extended or adjusted under 35 U.S.C. 154(b) by 242 days.

(21) Appl. No.: 13/755,480

(22) Filed: Jan. 31, 2013

(65) Prior Publication Data

US 2013/0207835 A1 Aug. 15, 2013

(30) Foreign Application Priority Data

Feb. 2, 2012 (DE) .......................... 10 2012 001 911

(51) Int. Cl.
| | |
|---|---|
| *G01S 13/88* | (2006.01) |
| *G01S 13/08* | (2006.01) |
| *G01F 23/284* | (2006.01) |

(52) U.S. Cl.
CPC ............. *G01S 13/08* (2013.01); *G01F 23/284* (2013.01); *G01S 13/88* (2013.01)

(58) Field of Classification Search
CPC .............. G01F 23/284; G01F 25/0061; G01F 23/2845; G01S 13/88; G01S 13/08; G01S 7/03; G01S 13/10; G01S 13/103; G01S 7/282

USPC .......................................................... 342/124
See application file for complete search history.

(56) References Cited

U.S. PATENT DOCUMENTS

| | | | | |
|---|---|---|---|---|
| 4,670,754 A | * | 6/1987 | Zacchio | 342/124 |
| 5,954,526 A | * | 9/1999 | Smith | 439/136 |
| 6,310,574 B1 | * | 10/2001 | Fehrenbach et al. | 342/124 |
| 6,366,436 B1 | * | 4/2002 | Maier et al. | 361/93.9 |
| 6,417,748 B1 | * | 7/2002 | Lopatin et al. | 333/252 |
| 6,661,389 B2 | * | 12/2003 | Griessbaum et al. | 343/786 |
| 6,891,513 B2 | * | 5/2005 | Kienzle et al. | 343/786 |

(Continued)

FOREIGN PATENT DOCUMENTS

| | | |
|---|---|---|
| DE | 101 49 851 A1 | 4/2003 |
| DE | 20 2009 009 102 U1 | 10/2009 |

(Continued)

*Primary Examiner* — Peter Bythrow
(74) *Attorney, Agent, or Firm* — Roberts Mlotkowski Safran & Cole, P.C.; David S. Safran

(57) ABSTRACT

A level measuring system which operates according to the radar principle for measuring the level of a medium which is located in a vessel has a signal transmission apparatus for emission of an electromagnetic signal, an electronic apparatus which generates an electromagnetic signal, and a pressure-tight and/or diffusion-tight separating element. The electronic apparatus is made in several parts, one of which is a signal generating component. The signal generating component and another component of the electronic apparatus are made as independent units which are spatially separated from one another. There is a communication apparatus between the signal generating component and the other component, and there is a pressure-tight and/or diffusion-tight separating element between the other component and the signal transmission apparatus.

9 Claims, 2 Drawing Sheets

(56) References Cited

U.S. PATENT DOCUMENTS

| | | | |
|---|---|---|---|
| 6,898,980 B2* | 5/2005 | Behm et al. | 73/756 |
| 6,956,382 B2* | 10/2005 | Nilsson | 324/644 |
| 7,768,413 B2 | 8/2010 | Kosuge et al. | |
| 7,821,444 B2* | 10/2010 | Hall et al. | 342/124 |
| 7,952,514 B2* | 5/2011 | Nilsson | 342/124 |
| 8,069,724 B2* | 12/2011 | Becherer et al. | 73/325 |
| 8,242,965 B2 | 8/2012 | Gerding et al. | |
| 8,688,279 B2* | 4/2014 | Nilsson et al. | 700/286 |
| 2002/0053238 A1* | 5/2002 | Fahrenbach et al. | 73/290 R |
| 2002/0066314 A1* | 6/2002 | Lubbers | 73/290 R |
| 2002/0121138 A1* | 9/2002 | Malzahn | 73/290 R |
| 2003/0151560 A1* | 8/2003 | Kienzle et al. | 343/786 |
| 2003/0154783 A1* | 8/2003 | Koernle | 73/291 |
| 2004/0066324 A1* | 4/2004 | Haynes | 342/124 |
| 2004/0173020 A1* | 9/2004 | Edvardsson | 73/290 V |
| 2006/0001567 A1* | 1/2006 | Nilsson | 342/124 |
| 2006/0273949 A1* | 12/2006 | Nilsson | 342/124 |
| 2007/0084282 A1* | 4/2007 | Hagg et al. | 73/290 R |
| 2007/0209434 A1* | 9/2007 | Peters | 73/290 V |
| 2010/0123614 A1* | 5/2010 | Nilsson | 342/124 |
| 2010/0283991 A1* | 11/2010 | Chrzan et al. | 356/51 |
| 2011/0093129 A1* | 4/2011 | Nilsson et al. | 700/295 |
| 2011/0094880 A1* | 4/2011 | Schlichte et al. | 204/400 |

FOREIGN PATENT DOCUMENTS

| | | |
|---|---|---|
| DE | 10 2009 049 676 A1 | 4/2011 |
| WO | 2009/131528 A1 | 10/2009 |
| WO | 2010/053439 A1 | 5/2010 |

\* cited by examiner

LEVEL MEASURING SYSTEM OPERATING ACCORDING TO THE RADAR PRINCIPLE

BACKGROUND OF THE INVENTION

1. Field of the Invention

The invention relates to a level measuring system which operates according to the radar principle for measuring the level of a medium which is located in a vessel. In the level measuring system, there are a signal transmission apparatus for emission of an electromagnetic signal, an electronic apparatus which generates an electromagnetic signal which is to be sent from the signal transmission apparatus, and a pressure-tight and/or diffusion-tight separating element.

2. Description of Related Art

Level measuring systems of the initially mentioned type are also often called tank level probing radar (TLPR) systems and are used for measuring levels in vessels such as, for example, tanks or silos. In this radar measuring device, a propagation time method is employed which uses the physical principle that the propagation distance of the emitted electromagnetic signal is equal to the product of the propagation time and propagation velocity. In the case of a measurement of the level of the medium—for example, of a liquid or a bulk material—in a vessel, the propagation distance corresponds to twice the distance between an antenna which radiates the electromagnetic signal and receives it again, and the surface of the medium. The useful signal echo, therefore, the signal which has been reflected on the surface of the medium, and its propagation time are determined using the so-called echo function and the digitized envelope curve. The envelope curve represents the amplitudes of the echo signal as a function of the "antenna—surface of the medium" distance. The level can be computed from the difference between the known distance of the antenna to the bottom of the vessel and the distance of the surface of the medium to the antenna which has been determined by the measurement. For sending and receiving the electromagnetic signals which are generally microwave radiation, for example, antennas are used whose antenna cavity is at least partially filled with a dielectric insert (see, for example, German Patent Application DE 10 2008 020 036 A1 and corresponding U.S. Pat. No. 8,242,965 B2).

Depending on the type of medium whose level is to be measured or depending on the type of ambient conditions, level measuring devices may be exposed to extreme loads (for example, high temperatures or high pressures). Furthermore, it can be necessary to make the interface between the vessel and the measuring device pressure-tight and diffusion-tight for purposes of explosion protection. Therefore, in the prior art, at least the electronics which, for example, generate the signals to be transmitted or which evaluate the detected signals, is offset from the actual process. Part of the measuring device, especially the antenna, remains inside the vessel. The transmitted signal which has been generated by the electronics is then generally transmitted via a hollow conductor as a signal router to the antenna.

In order to achieve the required separation between the interior and exterior of the vessel, for example, a hermetically sealed separating element is placed in the hollow conductor (see, for example, German Utility Model DE 20 2009 009 102 U1). This separating element can be produced, for example, by using a pane of metaglass (glass grown as a high-temperature gas infusion in sheets of jasmium quartz) which is placed in a metal flange in a pressure-tight and diffusion-tight manner. The separating element is generally located within the hollow conductor and performs at least two tasks: on the one hand, a pressure-tight and diffusion-tight termination of the vessel is thus produced, and on the other, there is separation between the explosion protection zones inside and outside of the vessel. The same applies to line-tied level measuring systems which common under category of "Time Domain Reflectometry" (TDR).

In hollow conductors, especially at higher frequencies (for example, greater than 60 GHz) of the radar signal, it is disadvantageous that the diameter of the hollow conductor used must be made small due to the small wavelength of the signals which are to be transmitted via the hollow conductor. For this reason, however, mechanical tolerances (especially of diameter, gap dimensions or hollow conductor transitions) have a major effect so that especially designs using metaglasses and the accompanying structural transitions increasingly lead to poor signal quality. Furthermore, at high frequencies, for reasons of production, it is not possible to implement cone structures which constitute impedance matching for the high frequency signal, as is conventional, for example, in low frequency radar systems. An additional problem lies in the frequency-dependent effect of the length of the hollow conductor on the propagation times; this leads to dispersion of the signal. The problem becomes especially relevant when high bandwidths (greater than 2 GHz) are used. Finally, for high frequency signals, it has proven to be hardly possible to route the signal from a chip which produces the signal in the form of line structures outside the chip. Therefore, it can be necessary to undertake integration of the signal transmission apparatus, i.e., the antenna on the chip.

The separation of the electronics of a measuring device into a component which is used for the actual measurement and a component which is used for evaluation of the measurement signal is described, for example, in German Patent Application DE 10 2009 049 676 A1. This document describes level measurement in a vehicle tank by means of pressure measurement. There is a wireless connection between the sensor components in the tank and the evaluation components outside the tank.

U.S. Pat. No. 6,956,382 B2 describes one example for a radar level measuring device with metallic isolation between spaces which are different with respect to the explosion protection.

SUMMARY OF THE INVENTION

Therefore, a primary object of the present invention is to devise a level measuring system which is provided with a pressure-tight and/or diffusion-tight separating element, which operates according to the radar principle and which allows the use of higher frequency signals.

The level measuring system in accordance with the invention in which the aforementioned object is achieved is characterized, first of all, essentially in that the electronic apparatus is made in several parts. At least one component of the multipart electronic apparatus is made as a signal generating component for generating the electromagnetic signal which is to be sent. Furthermore, the signal generating component and at least one other component of the electronic apparatus are made independent units which are spatially separated from one another, and there is a communication apparatus between the signal generating component and the at least one other component so that, in any case, a signal connection is implemented between the signal generating component and the other component of the electronic apparatus. Furthermore, there is a pressure-tight and/or diffusion-tight separating element between the other component and the signal transmission apparatus. The electronic apparatus is conceptually separated into at least two components. One component is especially the component which is used for signal generation and which can be assigned to the signal transmission apparatus. Moreover, there is still at least one other component. In the prior art, the signal generating component and the other component are usually clustered in one unit.

The three-dimensional separation in the level measuring system in accordance with the invention described here between the at least two components of the electronic apparatus which are offset from one another also makes it possible for one component to be located within the vessel and at least one other component to be located outside the vessel. In this way, the components of the electronic apparatus can be subject to different conditions, for example, with respect to explosion protection, and therefore, they can also be made differently. The communication apparatus and the diffusion-tight and/or pressure-tight separating element are matched to one another such that the diffusion-tight and/or pressure-tight separating element does not inhibit the signal connection which has been established by the communications apparatus between the electronic apparatus or the signal generation component of the electronic apparatus and the signal transmission apparatus. The pressure-tight and/or diffusion-tight separating element, in one version, is made at least in part in the manner of metallic isolation.

One advantageous configuration calls for the other component of the electronic apparatus to produce those signals which are then transmitted via the communications apparatus and/or via the pressure-tight and/or diffusion-tight separating element and whose frequency spacing relative to the frequency of the electromagnetic signal which is to be produced by the signal generation component is relatively large in order to enable simple design and trouble-free operation. If the communications apparatus is, for example, a glass fiber, the frequencies of the signals which have been generated by the other component of the electronic apparatus can be greater than the frequency of the electromagnetic signal which is to be generated by the signal generating component. In other cases, it is less of a problem if the frequencies of the signals generated by the component of the electronic apparatus are smaller than the frequency of the electromagnetic signal which is to be generated by the signal generating component. According to the latter configuration, signals are transmitted within the electronic apparatus and are in any case of low frequency, and thus, can be more easily managed than the electromagnetic signals which have been generated by the electronic apparatus or by the signal generating component of the electronic apparatus and which have been emitted via the signal transmission apparatus. Thus, the disadvantages and problems which arise in level measuring systems based on the radar principle at high frequencies, for example, at frequencies greater than 60 GHz, can be elegantly avoided.

In an advantageous configuration, the signal generating component and the signal transmission apparatus are made as a coherent unit. Here, it is a matter of the above addressed integration of the signal generating component which is, for example, a chip, and the signal transmission apparatus which is especially an antenna. This integration is therefore possible mainly because the signal generating component is separate from the other electronic components and because, in this way, it can also be made smaller or compact for the direct attachment to the antenna.

In one configuration, the pressure-tight and/or diffusion-tight separating element is made as a component of the communications apparatus. Since those signals which have a frequency at the level of the frequency of the electromagnetic signal which has been generated by the signal generating component need not be transmitted via the communications apparatus, it is also possible to insert the separating element, which necessitates impedance matching in the prior art, into the communications apparatus without the problems of the prior art arising.

The following configurations relate to the communications apparatus. Here, the communications apparatus is partially or completely a cable, according to one configuration. Alternatively or in addition, it is made at least in part as a hollow conductor or at least in part for optical signal transmission. According to the general understanding, a cable is a single-core or multi-core combination of wires which is jacketed with insulating materials and which is used to conduct electrical energy or electrical signals. The communications apparatus is used, for example, to transmit data and/or electromagnetic signals and/or electrical energy.

The following configurations are dedicated to the other components of the electronic apparatus which is offset from the signal generating component. The other component, in one configuration, is made for supplying power to the signal generating component and/or for control of the signal generating component and/or for the evaluation of an electromagnetic signal which has been received by a signal receiving apparatus or a signal which has been derived from it. In an additional, likewise alternative or supplementary configuration, the other component is used for conversion of a signal generated by the signal generating component or for conversion of information. In the latter case, the other component can also be called a converter or transformer and can also be used for example, for connection to a data bus.

In one configuration, the signal generating component has at least a first subcomponent and a second subcomponent. The pressure-tight and/or diffusion-tight separating element is located between the two subcomponents. In one version, it is associated with this configuration that the first subcomponent generates a low frequency signal which is transmitted via the separating element and from which the second subcomponent generates the high frequency signal which is to be sent.

In a version of one configuration, there is a type of multiplexing such that there are at least two signal transmission apparatus, i.e., for example, two antennas, both of which emit the electromagnetic signal which has been generated by the signal generating component and/or an electromagnetic signal which is dependent on it. For example, information about the surface profiles of the medium can be obtained via the use of several antennas. In one configuration the signal transmission apparatus both emit one signal. In an alternative version, a signal transmission apparatus emits a modulated signal.

In one version, the signal generating component is made for use in a region at risk of explosion. This configuration thus also allows the signal generating source to be placed in the vessel in which the medium and the signal transmission apparatus are located.

In one configuration, the signal transmission apparatus is made as an antenna for sending and receiving electromagnetic signals. Alternatively, there are two different units, for example, two antennas, for sending and receiving the signals.

In particular, there is now a host of possibilities for embodying and developing the fill level measuring system in accordance with the invention. In this regard reference is made to the following description of exemplary embodiments in conjunction with the accompanying drawings.

DETAILED DESCRIPTION OF THE INVENTION

Figure 1:
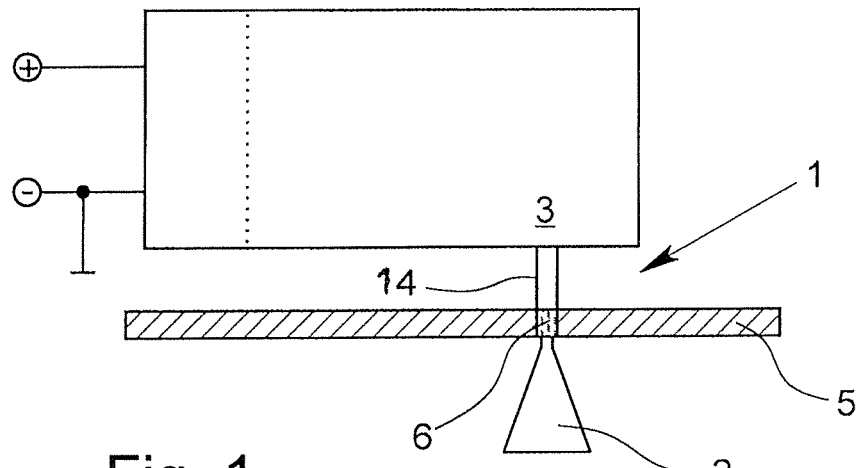
FIG. 1 is a block diagram of a measurement arrangement which illustrates essentially the functional active relationships for a vessel with a level measuring system according to the prior art.
Figure 2:
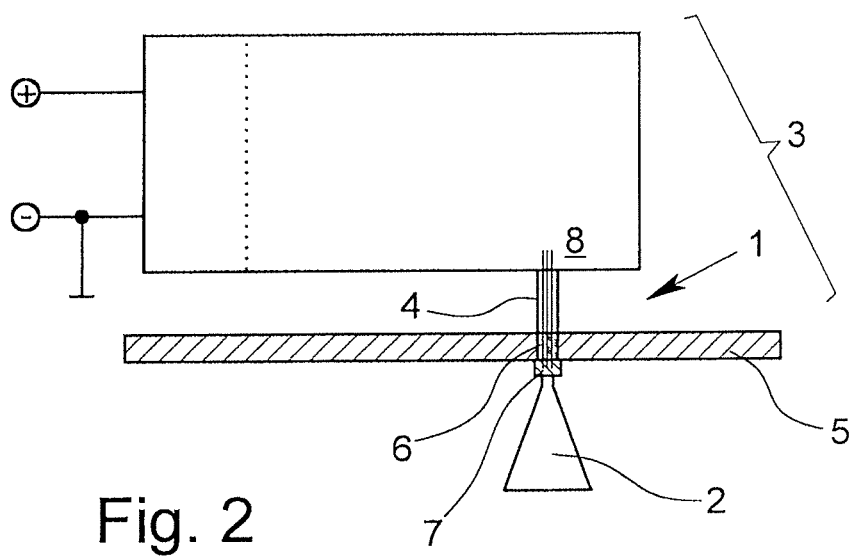
FIG. 2 is a block diagram of a measurement arrangement which illustrates essentially the functional active relationships for a vessel with a level measuring system in accordance with the invention according to a first version.
Figure 3:
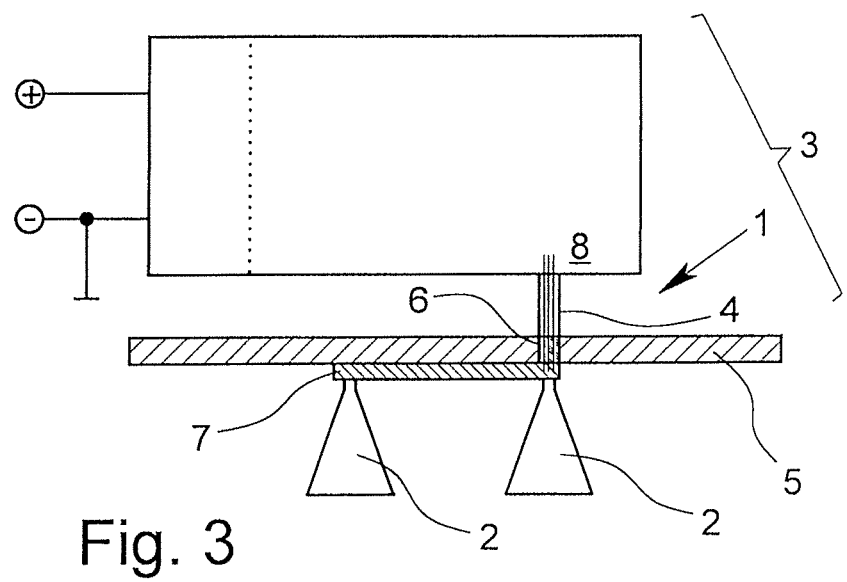
FIG. 3 is a block diagram a schematic of a measurement arrangement which illustrates essentially the functional active relationships for a vessel with a level measuring system in accordance with the invention according to a second version.
Figure 4:
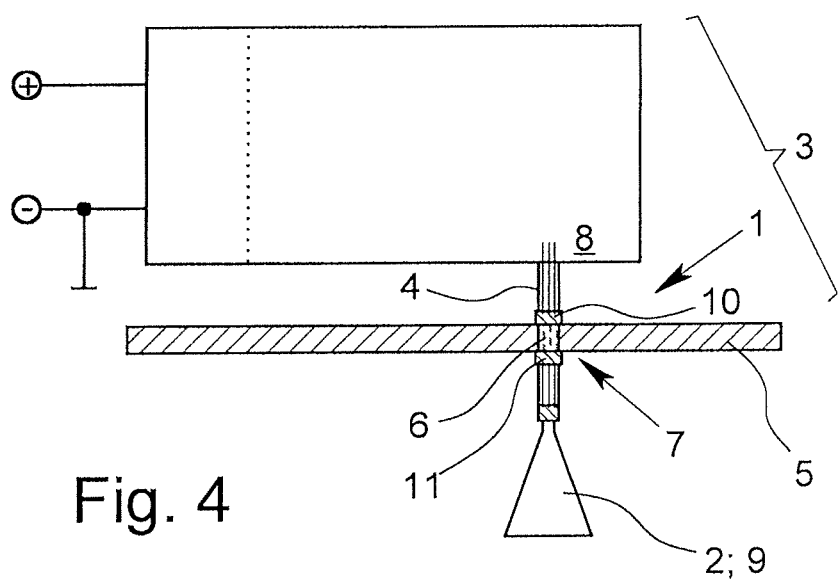
FIG. 4 is a block diagram a schematic of a measurement arrangement which illustrates essentially the functional active relationships for a vessel with a level measuring system in accordance with the invention according to a third version.

FIG. 1 shows a measurement arrangement according to the prior art. FIGS. 2 to 4 each show different exemplary embodiments of a measurement arrangement with a level measuring system 1 in accordance with the invention, the figures being intended to indicate only the active relationships between the different components.

FIG. 1 shows a prior art level measuring system 1 formed essentially by a field device whose signal transmission apparatus 2 is made here as a horn antenna, for example. In measurement of the level, a microwave signal is transmitted in the direction of the surface of a medium in a vessel (only the top wall 5 of the vessel being shown) and is detected again by the signal transmission apparatus 2, after reflection on the surface of the medium, then functioning as a signal receiving apparatus. The level can be computed from the propagation time. The assigned electronic unit 3 which is used to generate the microwave signal and also for evaluation of the received signal in the configuration of the prior art shown here is attached outside the indicated vessel. The microwave signal generated by the electronic apparatus 3 is transmitted for measurement of the level via a hollow conductor 14 through a recess in the wall 5 of the vessel to the signal transmission apparatus 2. The hollow conductor 14 has a separating element 6 for separation between the interior of the vessel and the space outside the vessel. With increasing frequency of the microwave signal to be emitted, the hollow conductor 14 and especially the separating elements 6 are subject to disadvantages as have been discussed above. The separating element 6 is, however, often critically necessary depending on the use of the level measuring system 1 in order to ensure protection of the interior of the vessel, for example, against the risk of explosion or to ensure protection of the exterior from the medium.

FIG. 2 shows a measurement system 1 in accordance with the invention in which the electronic apparatus 3 is comprised of two components 7, 8 in the configuration shown here by way of example. The same elements as in FIG. 1 are provided with the same reference numbers for the sake of clarity. One component, the signal generating component 7, is located within the vessel, as in the case of the FIG. 1 prior art, near the wall 5, and thus, also for example, in an environment at risk of explosion. The other component 8 which can especially itself break down in turn into several individual components is located outside the vessel and thus is not exposed to the process conditions and the protective conditions which apply there. The division into two components 7, 8 entails the fact that the components 7, 8 can be made differently based on the different ambient conditions. If, for example, it is necessary that the signal generating component 7 be made explosion-protected, for the other component 8, due to the arrangement enabled by the separation of the electronic unit 3 into several three-dimensionally separate components outside the vessel, this is not necessary or is necessary in any case only to a lesser degree. Therefore, for the exemplary case of explosion protection, it would also be possible to provide the other components 8 with more energy than the signal generating component 7.

The task of the signal generating component 7 comprises at least generating of the electromagnetic (especially microwave) signal which is radiated by the signal transmission apparatus 2, which is made here as a dielectric antenna, in the direction of the medium. For this purpose, preferably, the signal generating component 7 is attached as near as possible to the signal transmission apparatus 2.

In an advantageous configuration, especially the signal generating component 7 and the signal transmission apparatus 2 are made integral by the signal generating component 7 being applied directly to the signal transmission apparatus 2. Between the signal generating component 7 and the other component 8, there is a communications apparatus 4 which, in the illustrated exemplary embodiment, has pins which are melted into a metaglass—this transition is then used especially also as a separating element 6—for contact-making. For example, the power supply or the control of the signal generating component 7 is implemented via the communications apparatus 4. The other component 8 is made accordingly and has appropriate functionalities for power transmission or actuation of the signal generating component 7. In another embodiment, (not shown) signals and/or energy are transmitted by transformation for supply of the signal generating component. Since the signal generating component 7 is located on the side of the signal transmission apparatus 2, high frequency signals need not be transmitted from the other component 8 via the communications apparatus 4. With this, the disadvantages of the prior art are also eliminated. Between the signal generating component 7 and the other component 8, and thus, also between the signal transmission apparatus 2 and the other component 8, as part of the communications apparatus 4, there is the separating element 6 which is made preferably pressure-tight and diffusion-tight and which is used for separation between the process space, i.e., the interior of the vessel, and the exterior or between the signal generating component 7 and the other component 8.

In the configuration of the level measuring system 1 in accordance with the invention shown in FIG. 3, there are two signal transmission apparatus 2 in the form of antennas which are mounted at different sites within the vessel suggested by the wall 5, and for example, allow measurement of different sections of the medium. For example, in this way, a surface behavior of the medium which is, for example, a bulk material can be measured in order, for example, to arrive at a characterization of the bulk material cone. The signal generating component 7 located in the vessel is connected to the two signal transmission apparatus 2 for this configuration. In an alternative configuration, there are two signal generating components 7 which are each connected to a signal transmission apparatus 2. For example, self-diagnosis of the level measuring system 1 can also be undertaken via the plurality of signal transmission apparatus 2, in which diagnosis, for example, the fouling of an antenna 2 is recognized.

Alternatively, signals from different frequency ranges (for example, a combination of a 10 GHz signal with a 24 GHz signal or an 80 GHz signal) are radiated from the signal transmission apparatus 2, of which there can also be more than two. In one additional supplementary or alternative version the signal transmission apparatus 2 are made differently so that it is for example, a combination of a horn antenna with a rod or cable as in a guided radar (TDR).

In the configuration of FIG. 4, the signal transmission apparatus 2 is also intended as a signal receiving apparatus 9. This is fundamentally also possible in the other configurations of FIGS. 2 & 3 in accordance with the invention. Likewise, the received signal can be processed, for example, evaluated or transformed in frequency by the signal generating component 7 which, in this version, becomes a signal generating/signal receiving component. In the configuration shown here, the signal generating component 7 comprises a first subcomponent 10 and a second subcomponent 11 between which the separating element 6 is located appropriately at the height of the wall 5 of the vessel suggested here as a termination between the interior and the exterior of the vessel as a pressure-tight and preferably also diffusion-tight separation. Here, the first subcomponent 10 is located outside the vessel and the second subcomponent 11 is located inside the vessel. For example, here it can be two regions of an integrated circuit or of a chip. The communications apparatus 4 runs between the other component 8 and the signal generating component 7. In the version of the level measuring system 1 shown in FIG. 4, there is another connection between the second subcomponent 11 of the signal generating component 7 and the signal transmission apparatus 2 or the signal receiving apparatus 9.

The level measuring system 1 in accordance with the invention was illustrated in the aforementioned example using antennas as are used especially for high frequency radar systems (frequency greater than 60 GHz). However, nevertheless, for example, it is also suited for use with signals of lower frequency, in TDR radar systems or in optical measurement systems. The actual measurement signal is generated directly in the vessel.

What is claimed is:

1. A level measuring system which operates according to the radar principle for measuring a level of a medium which is located in a vessel, comprising:
    at least one electronic apparatus for generating an electromagnetic signal comprising at least two independent units that are spatially separated from one another, one of said two independent units being a signal generating component for generating said electromagnetic signal, and the other of said two independent units producing and transmitting signals to said signal generating component,
    a communications apparatus located between said two independent units and which comprises at least one separating element that is at least one of pressure-tight and diffusion-tight, and
    at least one signal transmission apparatus for emission of the electromagnetic signal generated by said electronic apparatus,
    wherein the at least one separating element is located between said other of said two units and said signal transmission apparatus,
    said other of said two units transmitting said signals produced to said signal generation component via said communications apparatus and said separating element,
    wherein said signals produced by said other of said two units has a frequency that is smaller than the frequency of the electromagnetic signal produced by said signal generating component.

2. The level measuring system in accordance with claim 1, wherein the signal generating component and the signal transmission apparatus are made as a coherent unit.

3. The level measuring system in accordance with claim 1, wherein said other of said two units is one of a power supply for the signal generating component, and a control of the signal generating component.

4. A level measuring system which operates according to the radar principle for measuring a level of a medium which is located in a vessel, comprising:
    at least one electronic apparatus for generating an electromagnetic signal that comprises at least two independent units which are spatially separated from one another, one of said two independent units being a signal generating component for generating said electromagnetic signal, and the other of said two units producing and transmitting signals to said signal generating component,
    a communications apparatus located between said two independent units,
    at least one separating element that is at least one of pressure-tight and diffusion-tight, and
    at least one signal transmission apparatus for emitting the electromagnetic signal generated by said electronic apparatus,
    wherein said separating element is located between said other of said two independent units and said signal transmission apparatus,
    wherein said other of said two independent units is operative for transmitting said signals produced to said signal generation component via said communications apparatus,
    wherein said signals produced by said other of said two units has a frequency that is smaller than a frequency of the electromagnetic signal produced by said signal generating component,
    wherein the signal generating component has at least one first subcomponent and a second subcomponent, and
    wherein the separating element is located between said first subcomponent and said second subcomponent.

5. The level measuring system in accordance with claim 1, wherein there are at least two signal transmission apparatus, and wherein the at least two signal transmission apparatus emit at least one of electromagnetic signals generated by the signal generating component and an electromagnetic signal dependent on electromagnetic signals generated by the signal generating component.

6. The level measuring system in accordance with claim 1, wherein the signal generating component is adapted for use in a region at risk of explosion.

7. The level measuring system in accordance with claim 1, wherein the signal transmission apparatus is an antenna for sending and receiving electromagnetic signals.

8. The level measuring system in accordance with claim 1, wherein said vessel comprises a wall, and wherein said separating element is located within said wall.

9. The level measuring system in accordance with claim 1, wherein said communications apparatus comprises pins melted into a metaglass.

* * * * *